United States Patent
Tsuruya

(10) Patent No.: US 7,218,535 B2
(45) Date of Patent: *May 15, 2007

(54) DC CONVERSION APPARATUS

(75) Inventor: Mamoru Tsuruya, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/302,234

(22) Filed: Dec. 14, 2005

(65) Prior Publication Data

US 2006/0139969 A1 Jun. 29, 2006

(30) Foreign Application Priority Data

Dec. 28, 2004 (JP) ............................. 2004-381737

(51) Int. Cl.
*H02M 3/335* (2006.01)
*H02M 7/217* (2006.01)

(52) U.S. Cl. .................................. 363/21.06; 363/127

(58) Field of Classification Search ................ 363/20, 363/21.01, 21.04, 21.06, 21.12, 21.14, 56.1, 363/56.11, 89, 97, 127, 131
See application file for complete search history.

(56) References Cited

U.S. PATENT DOCUMENTS 6,011,903 A * 1/2000 Nosenchuck ................ 392/385
6,191,964 B1 * 2/2001 Boylan et al. ................. 363/89
7,038,922 B2 * 5/2006 Diallo et al. .............. 363/21.06
7,057,906 B2 * 6/2006 Tamura .................... 363/21.04

FOREIGN PATENT DOCUMENTS

JP 2002-10636 1/2002

OTHER PUBLICATIONS

U.S. Appl. No. 11/302,234, filed Dec. 14, 2005, Tsuruya.
U.S. Appl. No. 11/302,184, filed Dec. 14, 2005, Tsuruya, et al.

* cited by examiner

*Primary Examiner*—Gary L. Laxton
(74) *Attorney, Agent, or Firm*—Oblon, Spivak, McClelland, Maier & Neustadt, P.C.

(57) ABSTRACT

A DC conversion apparatus includes a switch that converts a DC voltage of a DC power source to a high-frequency voltage by being turned ON/OFF via a primary winding of a transformer, a synchronous rectifying circuit that performs synchronous rectification of a high-frequency voltage generated at a secondary winding, a smoothing circuit that smoothes a rectified output of the synchronous rectifying circuit by a smoothing reactor and a smoothing capacitor, and outputs a DC voltage, a capacitor that stores via a diode, energy stored in the smoothing rector due to a current backflow of the synchronous rectifying circuit under light load condition, a switch that is turned ON in synchronization with the switch, and returns the energy stored in the capacitor via the transformer to a primary side thereof, and a control circuit that turns ON/OFF the switch.

11 Claims, 11 Drawing Sheets

DC CONVERSION APPARATUS

BACKGROUND OF THE INVENTION

The present invention relates to a highly efficient and compact DC conversion apparatus such as a DC/DC converter.

FIG. 1 is a circuit configuration diagram of a conventional DC conversion apparatus. In the DC conversion apparatus shown in FIG. 1, a synchronous rectifier that includes a low on-resistance power MOSFET (Field-Effect Transistor) and the like is used on a secondary side (output side) of a transformer in order to reduce power losses.

In FIG. 1, a MOSFET (Field-Effect Transistor) switch Q1 is connected to a DC power source vdc1 via a primary winding 5a (the number of turns of n1) of a transformer T1, and a series circuit of a resistor R1 and a capacitor C1 is connected to both ends of the switch Q1. A series circuit of a diode D2 and a capacitor C2 is connected to both ends of the primary winding 5a of the transformer T1, and a resistor R2 is connected to both ends of the capacitor C2. The switch Q1 is turned ON/OFF by PWM control of a control circuit 10.

The primary winding 5a of the transformer T1 and a secondary winding 5b (the number of turns is n2) of the transformer T1 each have a winding structure such that a common mode voltage is generated mutually, and a MOSFET switch Q3 and a MOSFET switch Q4 are connected in series to both ends of the secondary winding 5b of the transformer T1. One end of the secondary winding 5b (at filled circle (●) side) of the transformer T1 is connected to a gate of the switch Q4, and the other end thereof is connected to a gate of the switch Q3. The switch Q3 is connected to a diode D3 in parallel, and the switch Q4 is connected to a diode D4 in parallel. These devices form a synchronous rectifying circuit. This synchronous rectifying circuit rectifies a voltage (ON/OFF-controlled pulse voltage) generated at the secondary winding 5b of the transformer T1 in synchronization with ON/OFF operations of the switch Q1, and outputs a DC voltage.

A smoothing reactor Lo and a smoothing capacitor Co are connected in series to both ends of the switch Q3 to form a smoothing circuit. This smoothing circuit smoothes a rectified output of the synchronous rectifying circuit, and outputs a DC output to a load RL.

The control circuit 10 ON/OFF controls the switch Q1 so that the width of an ON-pulse applied to the switch Q1 is narrowed when the output voltage of the load RL reaches or exceeds a reference voltage. That is, when the output voltage of the load RL reaches or exceeds the reference voltage, the width of the ON-pulse applied to the switch Q1 is narrowed so as to control the output voltage to a constant voltage.

Operations of the DC conversion apparatus thus configured are explained with reference to a timing chart at light load time shown in FIG. 2. In FIG. 2, a drain-source voltage of the switch Q1 is depicted by Q1v, a drain current of the switch Q1 is depicted by Q1i, a drain current of the switch Q3 is depicted by Q3i, a drain current of the switch Q4 is depicted by Q4i, a drain-source voltage of the switch Q3 is depicted by Q3v, and a gate voltage signal of the switch Q1 is depicted by Q1g.

Operations performed under high load are explained first. When the switch Q1 is turned ON by the gate voltage signal Q1g, the current Q1i flows through a path passing along Vdc1, 5a, Q1, and Vdc1. This current Q1i increases linearly with time.

At this time, since a voltage is generated also at the secondary winding 5b of the transformer T1, the switch Q4 is turned ON and hence the current Q4i flows clockwise through a path passing along 5b, Lo, Co, Q4, and 5b, so that electric power is supplied to the load RL. The current Q4i increases linearly with time, whereupon Lo(Io)2/2 of energy is stored in the smoothing reactor Lo. A current flowing into the smoothing rector Lo is depicted by Io.

When the switch Q1 is turned OFF, a reverse voltage is generated at the secondary winding 5b of the transformer T1, and hence the switch Q4 is turned OFF and the switch Q3 is turned ON. Therefore, the energy stored in the smoothing reactor Lo causes the current Q3i to flow clockwise through a path passing along Lo, Co, Q3, and Lo, so that electric power is supplied continuously to the load RL.

Subsequently, when the switch Q1 is turned ON, the voltage generated at the secondary winding 5b is reversed again, therefore the switch Q4 is turned ON and the switch Q3 is turned OFF, and then the similar operations as previously described are performed. Since the current of the smoothing reactor Lo flows continuously in the same direction, this state is called a continuous mode.

On the other hand, when a load current decreases (light load condition), a current of the smoothing reactor Lo flowing therethrough as the switch Q1 is turned OFF (e.g., time t32) becomes zero while the switch Q1 is OFF, but the switch Q3 remains ON. Therefore, the electric charge stored in the smoothing capacitor Co is discharged, and then a current Q3i' flows counterclockwise through a path passing along Co, Lo, Q3, and Co, so that the energy is stored in the smoothing reactor Lo.

When the switch Q1 is turned ON at time t33 (same as time t31), the switch Q4 is turned ON and the switch Q3 is turned OFF. Therefore, a current Q4i' flows counterclockwise through a path passing along Lo, 5b, Q4, Co, and Lo from the smoothing reactor Lo. As a result, the energy is finally returned to the DC power source vdc1 on a primary side (input side) via the primary winding 5a of the transformer T1.

As described above, when a synchronous rectifying circuit is applied to the conventional DC conversion apparatus shown in FIG. 1 or to a switching power source device described in Japanese Patent Application Laid-Open No. 2002-10636, they operate with little loss in a high load state in which a current flows continuously through the smoothing reactor Lo.

SUMMARY OF THE INVENTION

In a light load condition as shown in FIG. 2, however, a current of the smoothing reactor Lo flowing therethrough is not continuous and flows backward in a return mode. When the switch Q3 is OFF, the energy stored in the smoothing reactor Lo is returned to the DC power source vdc1 on the input side via the switch Q4 and the transformer T1.

At this time, delay of an ON-timing of the switch Q4 or high leakage inductance of the transformer T1 generates a large spike voltage SP as shown in FIG. 2, causing a breakdown of devices (synchronous rectifier).

In order to solve this problem, it is necessary to additionally provide a spike voltage absorbing circuit such as an absorber having a combination of the resistor R1 and the capacitor C1, and a combination of the resistor R2 and the capacitor C2. Furthermore, the reverse current is detected to stop the synchronous rectification, or high withstand voltage devices are used. These measures lead to complex circuitry and increased losses.

According to the present invention, a DC conversion apparatus that can offer high efficiency and achieve a size reduction by reducing losses and simplifying the circuitry can be provided.

The present invention adopts following means to solve the above problems. A first technical aspect of the present invention provides a DC conversion apparatus including: a first switch that converts a DC voltage of a DC power source to a high-frequency voltage by being turned ON/OFF via a primary winding of a transformer; a synchronous rectifying circuit that performs synchronous rectification of a high-frequency voltage generated at a secondary winding of the transformer; a smoothing circuit that smoothes a rectified output of the synchronous rectifying circuit by a smoothing reactor and a smoothing capacitor, and outputs a DC voltage; a capacitor that stores via a diode, energy stored in the smoothing reactor due to a current backflow of the synchronous rectifying circuit caused at light load time; a second switch that is turned ON in synchronization with the first switch, and that returns the energy stored in the capacitor via the transformer to a primary side thereof; and a control circuit that turns ON/OFF the first switch.

A second technical aspect of the present invention provides a DC conversion apparatus including: a first switch that converts a DC voltage of a DC power source to a high-frequency voltage by being turned ON/OFF via a primary winding of a transformer; a synchronous rectifying circuit that performs synchronous rectification of a high-frequency voltage generated at a secondary winding of the transformer; a smoothing circuit that smoothes a rectified output of the synchronous rectifying circuit by a smoothing reactor and a smoothing capacitor, and outputs a DC voltage; a capacitor that stores via a diode, energy stored in the smoothing reactor due to a current backflow of the synchronous rectifying circuit caused at light load time; a second switch that is turned ON in synchronization with the first switch, and returns the energy stored in the capacitor via the transformer to a primary side thereof; a series circuit of a third switch and a clamp capacitor, the series circuit being connected to both ends of the primary winding of the transformer or to both ends of the first switch; and a control circuit that turns ON/OFF the first switch and the third switch alternately.

A third technical aspect of the present invention provides the DC conversion apparatus, in addition to the first or the second technical aspect, wherein the smoothing reactor is formed on an auxiliary winding of the transformer, the secondary winding of the transformer is tightly coupled with the primary winding of the transformer, and the auxiliary winding of the transformer is loosely coupled with the primary winding.

A fourth technical aspect of the present invention provides the DC conversion apparatus, in addition to the third technical aspect, wherein the number of turns of the secondary windings of the transformer is the same as that of the auxiliary winding, the secondary winding has a winding phase opposite to that of the primary winding of the transformer, and the auxiliary winding has the same winding phase as that of the primary winding.

A fifth technical aspect of the present invention provides the DC conversion apparatus, in addition to the first to the fourth technical aspects, further including a tertiary winding of the transformer connected to the secondary winding of the transformer in series, wherein the second switch is turned ON by a voltage generated at the tertiary winding of the transformer when the first switch is turned ON, and returns the energy stored in the capacitor via the transformer to the primary side thereof.

A sixth technical aspect of the present invention provides the DC conversion apparatus, in addition to the first to the fifth technical aspects, further including an ON-time setting unit that sets an ON-time of the second switch to be shorter than that of the first switch.

A seventh technical aspect of the present invention provides a DC conversion apparatus including: a first series circuit of a first switch and a second switch, the first series circuit being connected to both ends of a DC power source; a second series circuit of a third switch and a fourth switch, the second series circuit being connected to the both ends of the DC power source; a primary winding of a transformer connected to a junction of the first switch and the second switch, and to a junction of the third switch and the fourth switch; a synchronous rectifying circuit that performs synchronous rectification of high-frequency voltages generated at the secondary winding and the tertiary winding of the transformer by a fifth switch connected to the secondary winding of the transformer and by a sixth switch connected to a tertiary winding that is connected to the secondary winding of the transformer in series; a smoothing circuit that smoothes a rectified output of the synchronous rectifying circuit by a smoothing reactor and a smoothing capacitor, and outputs a DC voltage; a capacitor that stores via a diode, energy stored in the smoothing reactor due to a current backflow of the synchronous rectifying circuit caused at light load time; a seventh switch that is turned ON in synchronization with the first switch and the fourth switch, and returns the energy stored in the capacitor via the transformer to a primary side thereof; and a control circuit that turns ON/OFF the first, the fourth, and the fifth switches, and the second, the third, and the sixth switches, in a mutually complementary manner, and turns ON the seventh switch while the first, the fourth, and the fifth switches are ON at the same time.

DESCRIPTION OF THE PREFERRED EMBODIMENTS

Embodiments of a DC conversion apparatus according to the present invention will be explained in detail below with reference to the drawings. According to the DC conversion apparatus of the embodiments, a spike voltage is eliminated in such that energy stored in a smoothing reactor due to a current backflow under light load condition is transferred to a capacitor via a diode, and the energy is returned to a primary side without any power loss by use of a second switch or a seventh switch (as a switching device) which is turned ON synchronize with turning a first switch on.

First Embodiment

Figure 1:
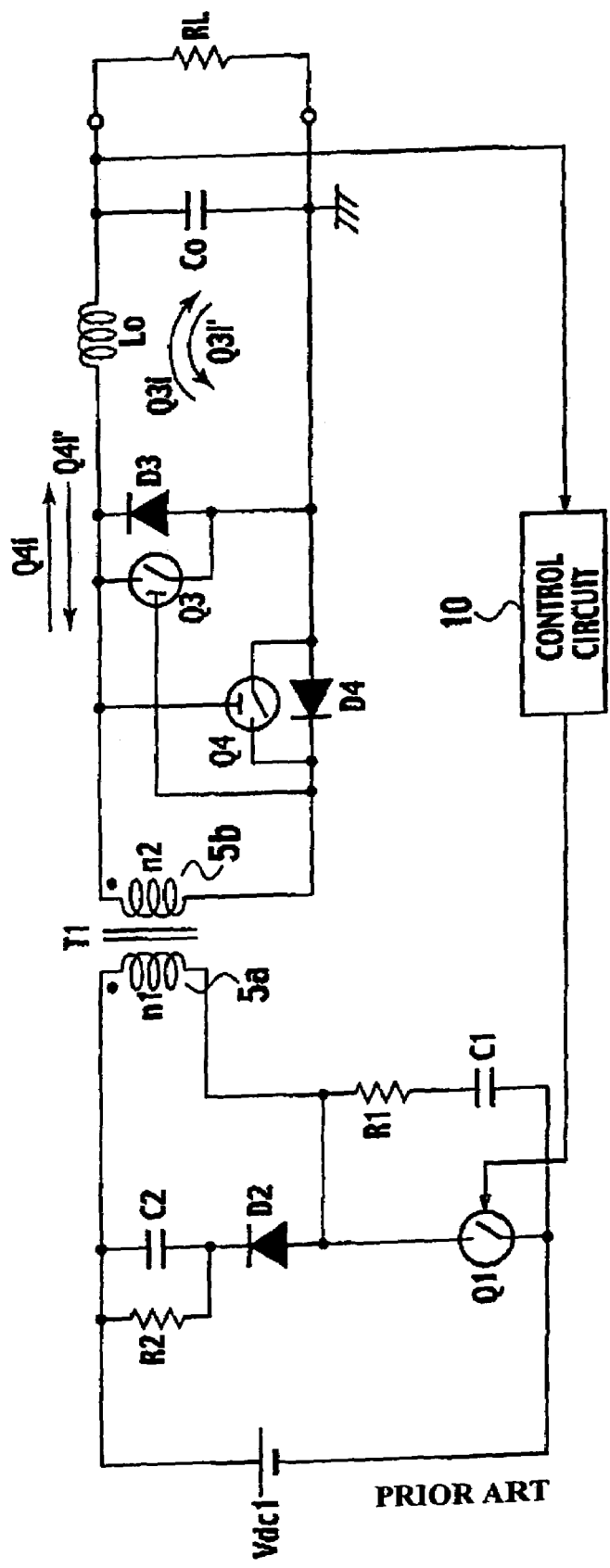
FIG. 1 is a circuit configuration diagram of a conventional DC conversion apparatus.
Figure 2:
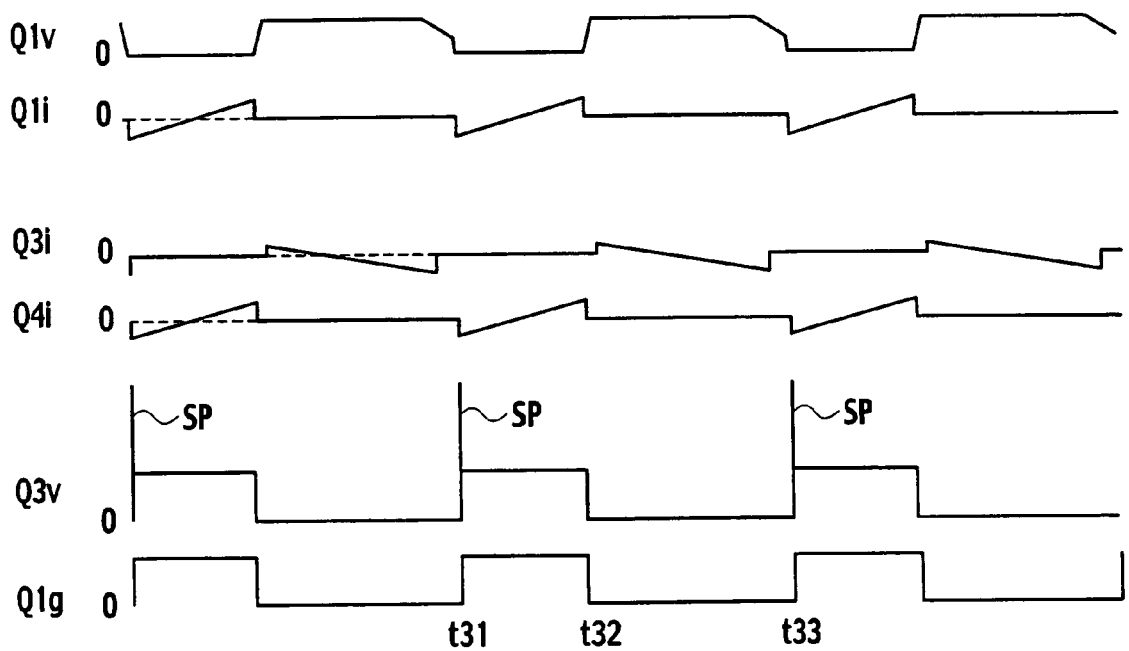
FIG. 2 is a timing chart of signals at each component of the DC conversion apparatus under light load condition shown in FIG. 1.
Figure 3:
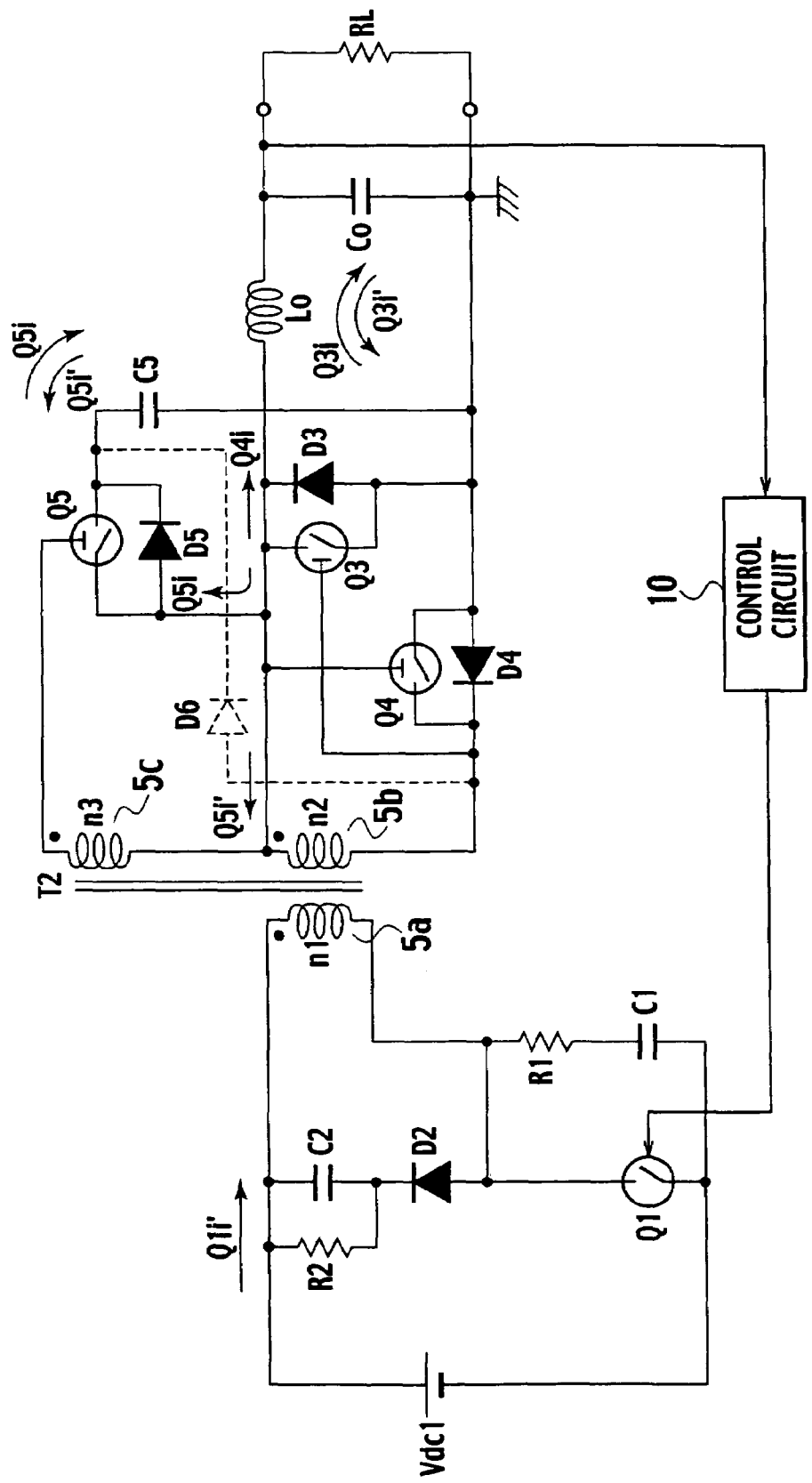
FIG. 3 is a circuit configuration diagram of a DC conversion apparatus according to a first embodiment.

FIG. 3 is a circuit configuration diagram of a DC conversion apparatus according to a first embodiment. The DC conversion apparatus in the first embodiment shown in FIG. 3 is different from the conventional one shown in FIG. 1 in that a transformer T2 is used and in that diodes D5 and D6, a capacitor C5, and a MOSFET switch Q5 (second switch) are additionally provided. Other configurations are the same as those shown in FIG. 1, so like reference signs denote like parts and details thereof will be omitted. Only the different parts will be explained.

The transformer T2 has a primary winding 5a (the number of turns is n1), a secondary winding 5b (the number of turns is n2) configured to be tightly coupled with the primary winding 5a and to have a winding structure such that a common mode voltage is generated, and a tertiary winding 5c (the number of turns is n3) configured to be tightly coupled with the primary winding 5a and to have a winding structure such that a common mode voltage is generated. The secondary winding 5b and the tertiary winding 5c are connected in series.

A MOSFET switch Q3 and a MOSFET switch Q4 are connected in series to both ends of the secondary winding 5b of the transformer T2. One end of the secondary winding 5b (at filled circle (●) side) of the transformer T2 is connected to a gate of the switch Q4, and the other end of the secondary winding 5b of the transformer T2 is connected to a gate of the switch Q3. The switch Q3 is connected to a diode D3 in parallel, and the switch Q4 is connected to a diode D4 in parallel. These devices form a synchronous rectifying circuit. This synchronous rectifying circuit rectifies a voltage (ON/OFF controlled pulse voltage) generated at the secondary winding 5b of the transformer T2 in synchronization with ON/OFF operations of a MOSFET switch Q1 (first switch), and a DC voltage is outputted.

The anode of the diode D5 is connected to a junction of the secondary winding 5b and the tertiary winding 5c, the cathode of the diode D3, and one end of a smoothing reactor Lo. The cathode of the diode D5 is connected to one end of the capacitor C5, and the other end of the capacitor C5 is connected to one end of the smoothing capacitor Co and the anodes of the diodes D3 and D4. The diode D5 is connected between the source and the drain of the switch Q5, and a gate of the switch Q5 is connected to one end of the tertiary winding 5c (at filled circle (●) side).

The diode D6 is connected between a joint of the secondary winding 5b and the cathode of the diode D4 and a joint of the cathode of the diode D5 and the capacitor C5. This diode D6 is provided to suppress a spike voltage, by absorbing the energy of the spike voltage generated at recovery time of the diode D4 in the capacitor C5.

Figure 4:
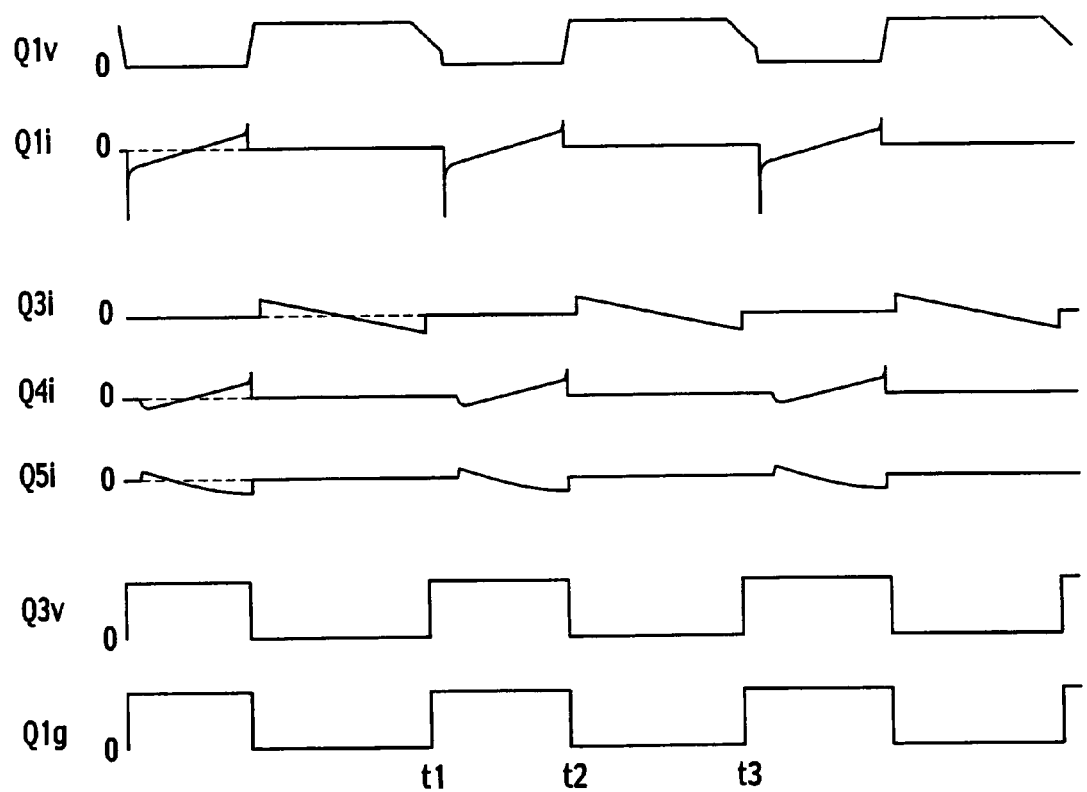
FIG. 4 is a timing chart of signal at each component of the DC conversion apparatus under light load condition according to the first embodiment.

Operations of the DC conversion apparatus of the embodiment are explained with reference to a timing chart for light load condition as shown in FIG. 4. In FIG. 4, a drain-source voltage of the switch Q1 is depicted by Q1$v$, a drain current of the switch Q1 is depicted by Q1$i$, a drain current of the switch Q3 is depicted by Q3$i$, a drain current of the switch Q4 is depicted by Q4$i$, a drain current of the switch Q5 is depicted by Q5$i$, a drain-source voltage of the switch Q3 is depicted by Q3$v$, and a gate voltage signal of the switch Q1 is depicted by Q1$g$.

Operations performed under high load condition are explained first. When the switch Q1 is turned ON by the gate voltage signal Q1$g$, the current Q1$i$ flows clockwise through a path passing along Vdc1, 5a, Q1, and vdc1. This current Q1$i$ increases linearly with time.

At this time, a voltage is generated also at the secondary winding 5b of the transformer T2, and hence the switch Q4 is turned ON and the current Q4$i$ flows clockwise through a path passing along 5b, Lo, Co, Q4, and 5b, so that electric power is supplied to a load RL. The current Q4$i$ also increases linearly with time, whereupon Lo(Io)2/2 of energy is stored in the smoothing reactor Lo. A current flowing through the smoothing reactor Lo is depicted by Io.

When the switch Q1 is turned OFF, the voltage at the secondary winding 5b of the transformer T2 is reversed, so that the switch Q4 is turned OFF and the switch Q3 is turned ON. Therefore, the energy stored in the smoothing reactor Lo causes the current Q3$i$ to flow clockwise through a path passing along Lo, Co, Q3, and Lo, and hence electric power is supplied continuously to the load RL.

Subsequently, in a similar manner, when the switch Q1 is turned ON, the voltage of the secondary winding 5b is reversed again, then the switch Q3 is turned OFF and the switch Q4 is turned ON. This state is called a continuous mode in which the current of the smoothing reactor Lo flows continuously in the same direction.

On the other hand, when a load current decreases (light load condition), a current of the smoothing reactor Lo flowing therethrough when the switch Q1 is turned OFF (e.g., time t2) becomes zero while the switch Q1 is OFF, but the switch Q3 remains ON. Therefore, the electric charge stored in the smoothing capacitor Co is discharged, and then the current Q3$i$' flows counterclockwise through a path passing along Co, Lo, Q3, and Co, so that the energy is stored in the smoothing reactor Lo.

When the switch Q1 is turned ON at time t3 (same as time t1), a voltage at one end of the secondary winding 5b (at filled circle (●) side) of the transformer T2 is applied to the gate of the switch Q4 thereby turning ON the switch Q4 and turning OFF the switch Q3. Therefore, the energy stored in the smoothing reactor Lo is stored in the capacitor C5 via the diode D5. That is, the diode D5 is activated, and the current Q5$i$ starts to flow, thereby the energy is stored in the capacitor C5, so that the spike voltage is absorbed.

Since a voltage is generated at one end of the tertiary winding 5c (at filled circle (●) side) of the transformer T2, this voltage is applied to the gate of the switch Q5, thereby turning ON the switch Q5. Therefore, the current Q5$i$' flows counterclockwise through a path passing along C5, Q5, 5b, Q4, and C5, and as a consequence, the energy stored in the capacitor C5 is returned to the DC power source vdc1 on the primary side via the secondary winding 5b and the primary winding 5a.

As shown in FIG. 4, the voltage Q3v of the switch Q3 is clamped, so that no spike voltage is generated. Therefore, it is possible to set the withstand voltage of the switch Q3 at a lower value. Accordingly, the use of a low ON-resistance power device leads to a further reduction in losses.

As described above, according to the DC conversion apparatus of the first embodiment, the energy stored in the smoothing rector Lo due to a current backflow caused under light load condition is stored in the capacitor C5 via the diode D5, and by use of the switch Q5 that is tuned ON synchronously as the switch Q1 is ON, the energy is returned to the primary side without any loss, as a result, a spike voltage can be eliminated. Therefore, the withstand voltage of a rectification device can be set at lower levels, and ON-resistance can be reduced by use of a low withstand-voltage device. Furthermore, a C-R absorber for preventing from the spike voltage can be eliminated, so that the circuitry can be simplified.

Second Embodiment

Figure 5:
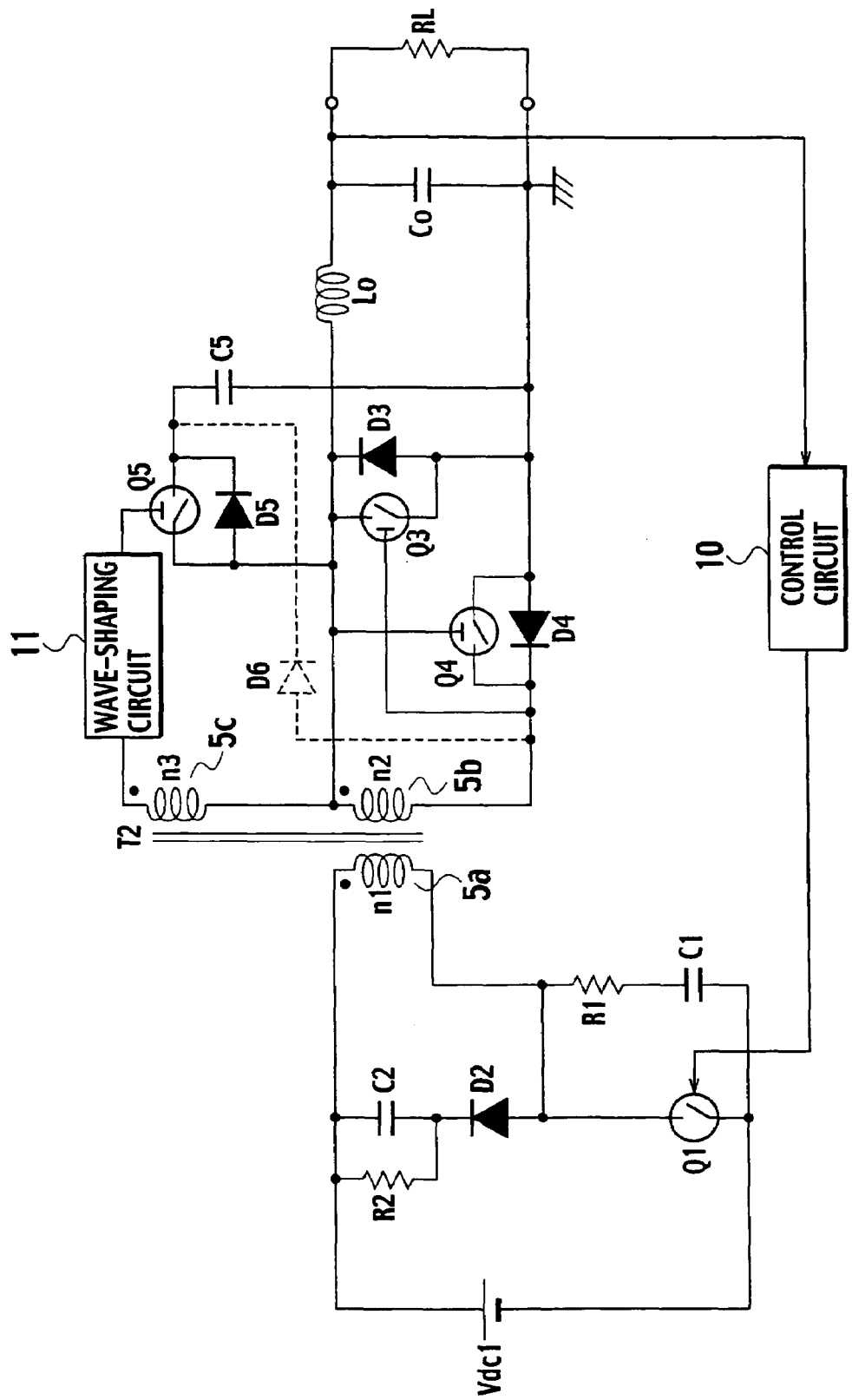
FIG. 5 is a circuit configuration diagram of a DC conversion apparatus according to a second embodiment.

FIG. 5 is a circuit configuration diagram of a DC conversion apparatus according to a second embodiment. The DC conversion apparatus as shown in FIG. 5 has a waveform shaping circuit 11 serving as an ON-time setting unit, between one end of the tertiary winding 5c of the transformer T2 and the gate of the switch Q5, in addition to the DC conversion apparatus as shown in FIG. 3.

Other configurations shown in FIG. 5 are the same as those shown in FIG. 3, so like reference signs denote like parts and details thereof will be omitted.

Figure 6:
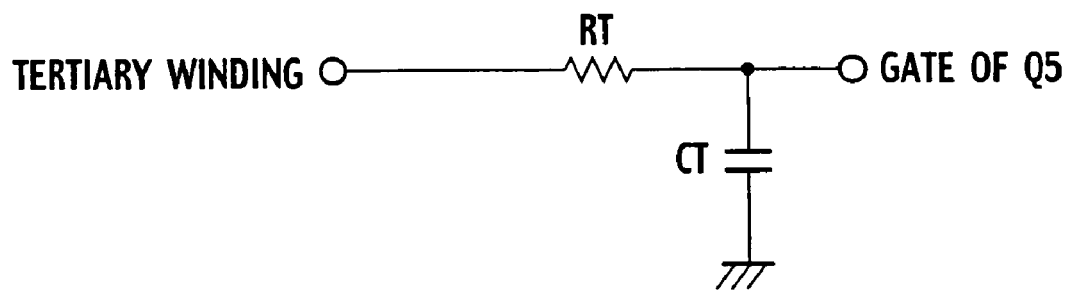
FIG. 6 is a diagram of an example of a waveform shaping circuit provided in the DC conversion apparatus according to the second embodiment.

The waveform shaping circuit 11 shapes the waveform of a voltage generated at the tertiary winding 5c of the transformer T2, so as to set the waveform of a drive voltage applied to the gate of the switch Q5 to be shorter than an ON-time of the switch Q1. FIG. 6 shows an example of the waveform shaping circuit 11. The waveform shaping circuit 11 has a time-constant circuit that includes a resistor RT having one end thereof being connected to the tertiary winding 5c and the other end thereof being connected to the gate of the switch Q5, and a capacitor CT being connected between the other end of the resistor RT and the ground.

Figure 7:
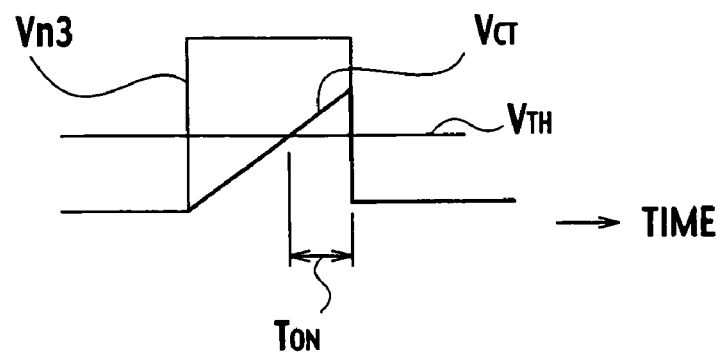
FIG. 7 is a diagram of an operational waveform of the waveform shaping circuit shown in FIG. 6.

The time-constant circuit having the resistor RT and the capacitor CT outputs voltage VCT across the capacitor CT with the waveform linearly increasing with time in response to an input rectangular voltage Vn3 of the tertiary winding 5c, and the voltage VCT is applied to the gate of the switch Q5 as shown in FIG. 7. As a result, the switch Q5 is turned ON only when the output voltage VCT of the waveform shaping circuit 11 reaches or exceeds a threshold voltage VTH of the gate of the switch Q5. That is, since an ON-time TON during which the switch Q5 is ON is set to be shorter than the ON-time of the switch Q1, the current of the switch Q5 under high load condition can be reduced.

Figure 8:
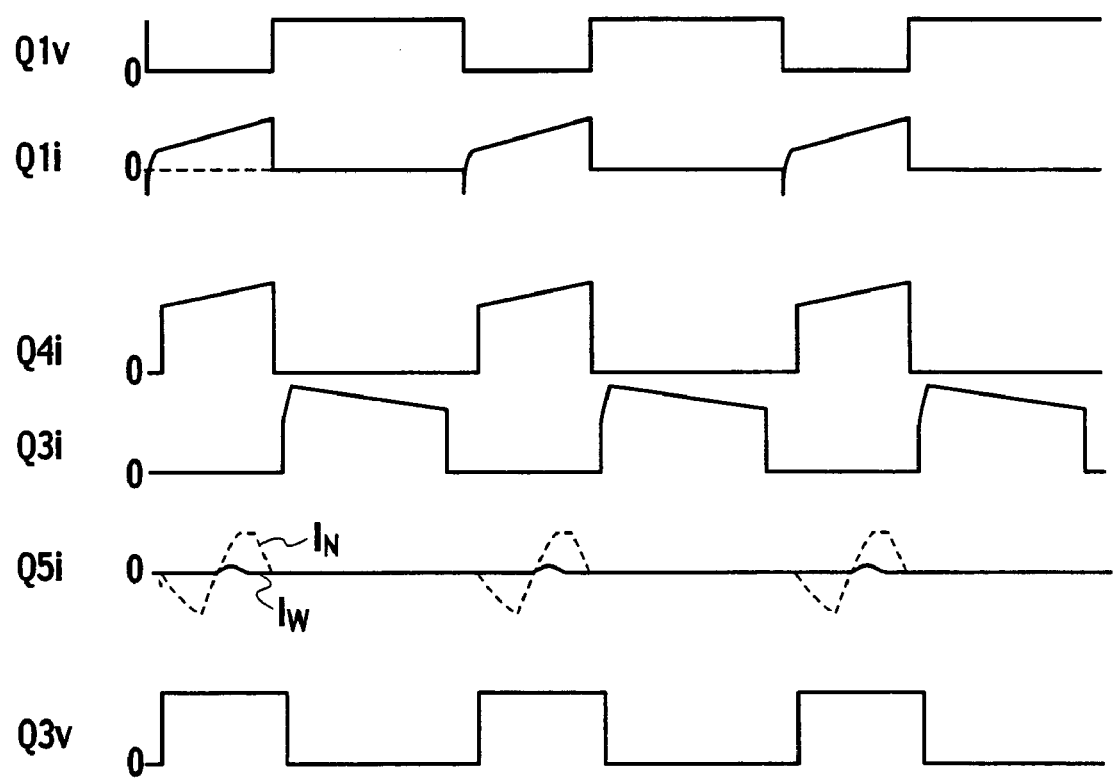
FIG. 8 is a timing chart of signal at each component of the DC conversion apparatus under high load condition.

FIG. 8 shows a timing chart of each signal of component under high load condition of the DC conversion apparatus according to the embodiment. As shown in FIG. 8, a broken line IN for the current Q5i of the switch Q5 corresponds to a case where the waveform shaping circuit 11 is not provided, and a solid line IW corresponds to a case of this embodiment. In the DC conversion apparatus according to this embodiment, it is apparent that the current of the switch Q5 under high load condition decreases due to the waveform shaping circuit 11.

When the switch Q5 is turned ON for the same period of time as the ON-time of the switch Q1 similarly to the first embodiment, a resonance circuit is formed of the capacitor C5 and a leakage inductance between the primary winding 5a and the secondary winding 5b of the transformer T2, and a resonance current flows therefrom. According to the second embodiment, the ON-time of the switch Q5 is set to be shorter, and thus the resonance circuit is blocked, so that the resonance current can be reduced.

Third Embodiment

Figure 9:
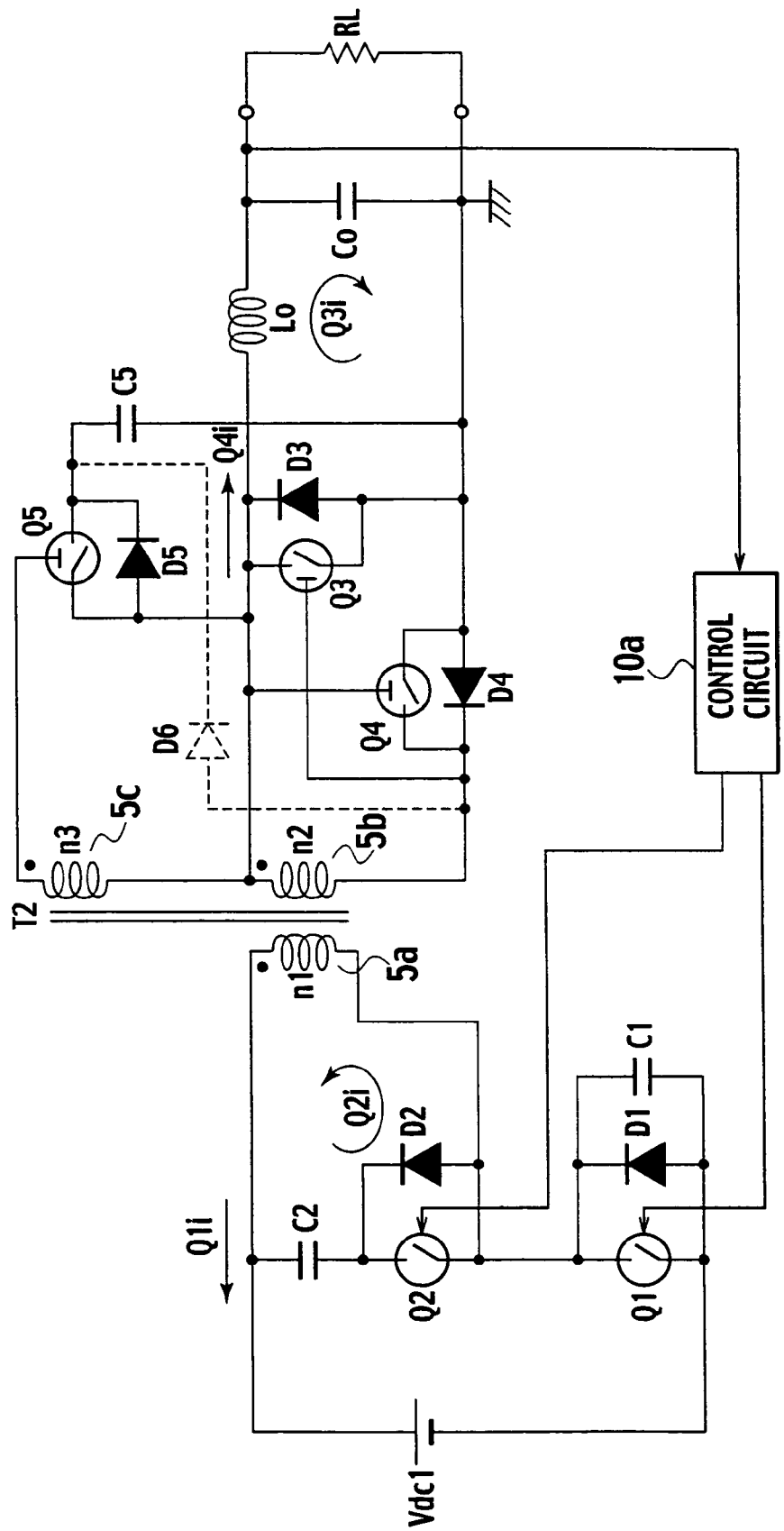
FIG. 9 is a circuit configuration diagram of a DC conversion apparatus according to a third embodiment.

FIG. 9 shows a circuit configuration diagram of a DC conversion apparatus according to a third embodiment. The DC conversion apparatus as shown in FIG. 9 includes a resonance circuit using an active-clamp topology in addition to the DC conversion apparatus of the first embodiment as shown in FIG. 3.

In FIG. 9, the MOSFET switch Q1 (first switch) is connected to the DC power source vdc1 via the primary winding 5a (the number of turns is n1) of the transformer T2, and the diode D1 and the capacitor C1 are connected in parallel to both ends of the switch Q1. The diode D1 can be a parasitic diode, and the capacitor C1 can have a parasitic capacity.

One end of a MOSFET switch Q2 (third switch) is connected to a junction of one end of the primary winding 5a of the transformer T2 and one end of the switch Q1, and the other end of the switch Q2 is connected to a positive electrode of the DC power source vdc1 via a clamp capacitor C2. Alternatively, the other end of the switch Q2 can be connected to a negative electrode of the DC power source vdc1 via the clamp capacitor C2.

The diode D2 is connected in parallel to both ends of the switch Q2. The diode D2 can be a parasitic diode of the switch Q2. The switches Q1 and Q2 each have a duration for which they are turned OFF (dead time), and are alternately turned ON/OFF by PWM control of a control circuit 10a.

The control circuit 10a alternately turns ON/OFF the switches Q1 and Q2 so that when an output voltage of a load RL reaches or exceeds a reference voltage, the width of an ON-pulse applied to the switch Q1 is narrowed and the width of an ON-pulse applied to the switch Q2 is widened. That is, when the output voltage of the load RL reaches or exceeds the reference voltage, this output voltage is regulated at a constant level by narrowing the ON-pulse width of the switch Q1.

Furthermore, the control circuit 10a turns ON the switch Q1 during a predetermined period of time after the switch Q1 reaches a zero-voltage condition due to resonance between the capacitor C1 connected to the switch Q1 in parallel, and a leakage inductance (not shown) between the primary winding and the secondary winding of the transformer T2.

Operations of the DC conversion apparatus thus configured according to the third embodiment will be explained. First, operations performed under high load condition are described.

When the switch Q2 is turned OFF, the voltage Q1v of the switch Q1 decreases due to the resonance of the capacitor C1 and the leakage inductance existing between the primary and the secondary windings of the transformer T2. When the switch Q1 is turned ON while the voltage Q1v thereof is zero, zero-voltage switching of the switch Q1 is achieved.

Next, when the switch Q1 is turned ON, the current Q1i flows clockwise through a path passing along vdc1, 5a, Q1, and vdc1. At this time, since a voltage is generated also at the secondary winding 5b of the transformer T2, the switch Q4 is turned ON and the current Q4$i$ flows clockwise through a path passing along 5$b$, Lo, Co, Q4, and 5$b$, so that electric power is supplied to a load RL. Lo(Io)2/2 of energy is stored in the smoothing reactor Lo at this time.

Subsequently, when the switch Q1 is turned OFF, a current flows due to exciting energy stored in the primary winding 5$a$, and then the capacitor C1 is charged. At this time, the leakage inductance between the primary and the secondary windings of the transformer T2 resonates with the capacitor C1, so that the voltage Q1$v$ of the switch Q1 increases.

When the electrical potential of the switch Q1 reaches that of the clamp capacitor C2, the diode D2 becomes conductive, and the clamp capacitor C2 starts to be charged. At this time, zero-voltage switching of the switch Q2 is achieved by turning ON the switch Q2. Furthermore, the voltage of the secondary winding 5$b$ of the transformer T2 is reversed, and therefore the switch Q4 is turned OFF and the switch Q3 is turned ON. As a result, the current Q3$i$ flows clockwise through a path passing along Lo, Co, Q3, and Lo due to the energy stored in the smoothing reactor Lo, so that the electric power is continuously supplied to the load RL.

Next, when the switch Q2 is turned ON, the current Q2$i$ flows counterclockwise through a path passing along C2, Q2, 5$a$, and C2, and finally the energy is returned to the primary winding 5$a$.

Since operations under light load condition are performed in the similar manner as those under light load condition according to the first embodiment, the descriptions thereof will be omitted.

As described above, according to the resonant DC conversion apparatus employing the active clamp topology, the leakage inductance between the primary and the secondary windings of the transformer T2 is larger, and the resonance between this leakage inductance and the capacitor C1 is utilized to achieve the zero-voltage switching of the switches Q1 and Q2. As a result, this leakage inductance makes the generation of the spike voltage more remarkable. However, this spike voltage can be eliminated by transferring the energy, that is stored in the smoothing reactor Lo due to a current backflow caused under light load condition, to the capacitor C5 via the diode D5, and returning the energy to the primary side of the transformer T2 without any loss by use of the switch Q5 which is turned ON synchronously when the switch Q1 is ON.

The waveform shaping circuit 11 as shown in FIG. 5 can be additionally provided between one end of the tertiary winding 5$c$ of the transformer T2 and the gate of the switch Q5 in the DC conversion apparatus as shown in FIG. 9. This achieves a similar advantageous effect as that obtained in the second embodiment.

Fourth Embodiment

Figure 10:
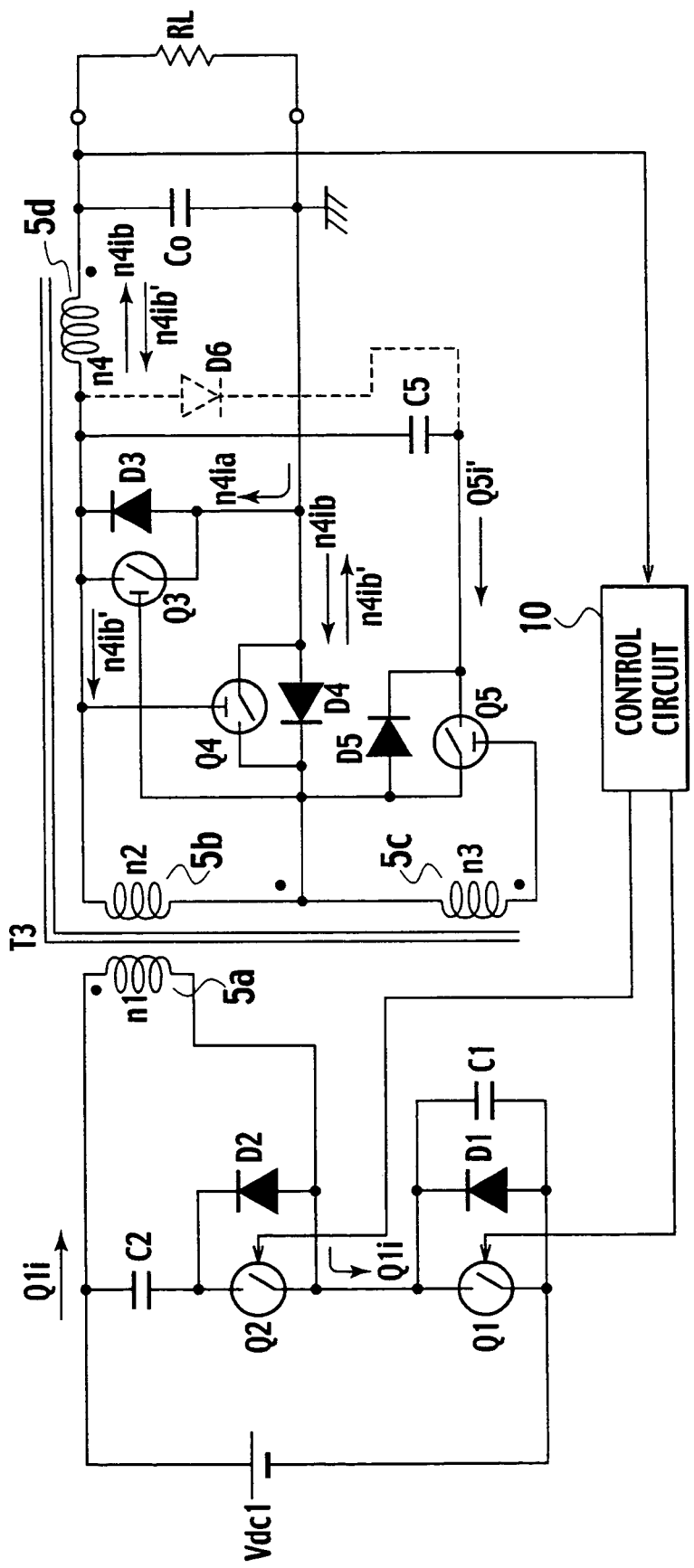
FIG. 10 is a circuit configuration diagram of a DC conversion apparatus according to a fourth embodiment.

FIG. 10 shows a circuit configuration diagram of a DC conversion apparatus according to a fourth embodiment. The DC conversion apparatus shown in FIG. 10 is different from that of the third embodiment shown in FIG. 9 in that a transformer T3 has a primary winding 5$a$ to a quaternary winding 5$d$ (corresponding to an auxiliary winding of the present invention in which the number of turns is n4), and in that the primary winding 5$a$ is loosely coupled with the quaternary winding 5$d$ and is also tightly coupled with the secondary winding 5$b$ and the tertiary winding 5$c$. When the switch Q1 is ON, DC excitation of the transformer T3 in its operating state is canceled by magnetomotive forces having the same magnitude but in opposite directions at the primary winding 5$a$ and the quaternary winding 5$d$, and when the switch Q1 is OFF, DC excitation of the transformer T3 in its operating state is canceled by magnetomotive forces having the same magnitude but in opposite directions at the secondary winding 5$b$ and the quaternary winding 5$d$ so as to increase an exciting inductance, resulting in a reduced exciting current and thus in reduced losses.

The quaternary winding 5$d$ is provided at a position corresponding to the smoothing reactor Lo shown in FIG. 9. The number of turns of the secondary winding 5$b$ of the transformer T3 is the same as that of the quaternary winding 5$d$ of the transformer T3. The secondary winding 5$b$ of the transformer T3 has a winding phase opposite to that of the primary winding 5$a$ of the transformer T3, and the tertiary winding 5$c$ and the quaternary winding 5$d$ of the transformer T3 have the same winding phase as that of the primary winding 5$a$ of the transformer T3.

The anode of the diode D5 is connected to a joint of the secondary winding 5$b$ and the tertiary winding 5$c$, the cathode of the diode D4, one end (drain) of the switch Q4, and the gate of the switch Q3. The cathode of the diode D5 is connected to one end of the quaternary winding 5$d$ via the capacitor C5. Both ends of the diode D5 are connected between the drain and the source of the switch Q5, and the gate of the switch Q5 is connected to one end (at filled circle (●) side) of the tertiary winding 5$c$. The diode D6 is connected to one end of the quaternary winding 5$d$ and one end of the capacitor C5.

Other configurations shown in FIG. 10 are the same as those shown in FIG. 9, so like reference signs denote like parts and details thereof will be omitted.

Figure 11:
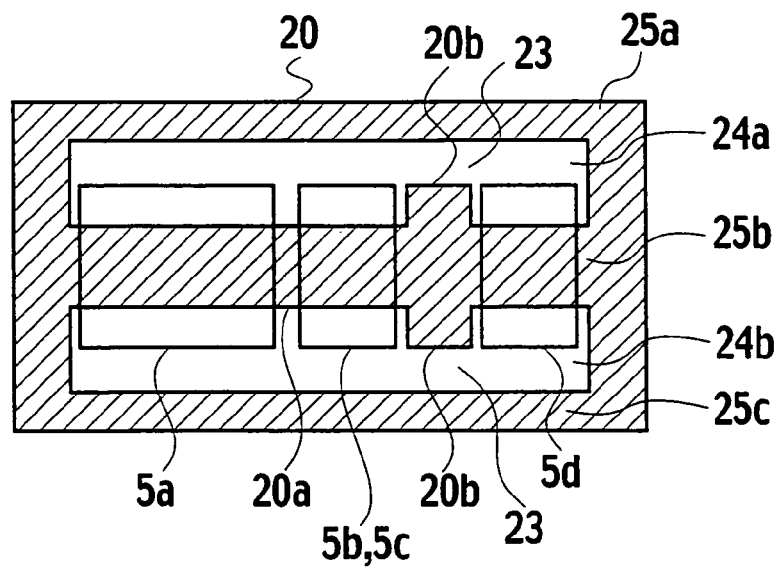
FIG. 11 is a configuration diagram of a transformer provided in the DC conversion apparatus according to the fourth embodiment.

FIG. 11 is a configuration diagram of the transformer provided in the DC conversion apparatus according to the fourth embodiment. The transformer shown in FIG. 11 includes a core 20 having a rectangular external shape and also having therein oblong apertures 24$a$ and 24$b$ that are formed to configure magnetic paths 25$a$, 25$b$, and 25$c$ in a longitudinal direction thereof. The primary winding 5$a$, the secondary and the tertiary windings 5$b$ and 5$c$ closely and tightly coupled with the primary winding 5$a$, and the quaternary winding 5$d$ loosely coupled with the primary winding 5$a$ are provided in a core part 20$a$ of the core 20. In order to loosely couple the primary winding 5$a$ with the quaternary winding 5$d$, a projecting portion 20$b$ is formed between the secondary and the tertiary windings 5$b$ and 5$c$, and the quaternary winding 5$d$ in the core part 20$a$. This projecting portion 20$b$ works to increase a leakage flux, resulting in a large leakage inductance of the quaternary winding 5$d$.

Figure 12:
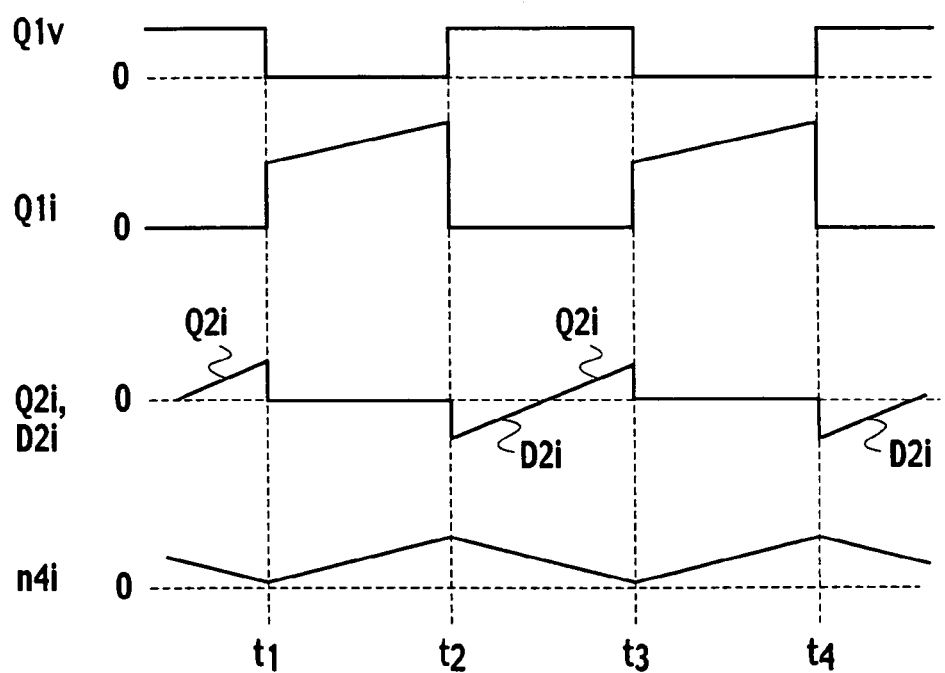
FIG. 12 is a timing chart of signal at each component of the DC conversion apparatus according to the fourth embodiment.

Operations of the DC conversion apparatus thus configured in the embodiment are explained next, with reference to a timing chart shown in FIG. 12. In FIG. 12, a voltage across the switch Q1 is depicted by Q1$v$, a current flowing into the switch Q1 is depicted by Q1$i$, a current flowing into the switch Q2 is depicted by Q2$i$, a current flowing into the diode D2 is depicted by D2$i$, and a current flowing into the quaternary winding 5$d$ of the transformer T3 is depicted by n4$i$.

First, operations performed under high load condition are explained. When the switch Q1 is turned ON at time t1, the current Q1$i$ (equivalent to a current I1 flowing through the primary winding 5$a$) flows clockwise through a path passing along vdc1, 5$a$, Q1, and vdc1. At the same time, a voltage is generated at the quaternary winding 5$d$ that is loosely coupled with the primary winding 5$a$, and then the current n4$ia$ (equivalent to a current I1' corresponding to the current I1) flows clockwise through a path passing along 5$d$, Co, Q3, and 5$d$, so that electric power is supplied to a load RL. The quaternary winding 5$d$ has a high leakage inductance as it is loosely coupled with the primary winding 5a. At this time, a relationship of I1·n1=I1'·n4 according to the law of equal ampere-turns, and hence the DC excitation is canceled.

Next, when the switch Q1 is turned OFF at time t2, a current flows due to exciting energy stored in the primary winding 5a, and then the capacitor C1 is charged. At this time, a leakage inductance (not shown) of the primary winding 5a of the transformer T3 resonates with the capacitor C1, and the voltage Q1v of the switch Q1 increases abruptly.

When the electrical potential of the switch Q1 reaches that of a clamp capacitor C2, the diode D2 becomes conductive, and then the clamp capacitor C2 starts to be charged as the current D2i (shown in FIG. 12) flows into the diode D2. At this time, zero-voltage switching of the switch Q2 is achieved by turning ON the switch Q2.

Subsequently, the clamp capacitor C2 is completely charged, and the electrical charge stored therein is returned to the primary winding 5a via the switch Q2. At this time, the filled circle side of the primary winding 5a is negative, and the non-circle side thereof is positive. Therefore, also on the secondary side of the transformer T3, the filled circle side of the secondary winding 5b is negative and the non-circle side thereof is positive, and the filled circle side of the quaternary winding 5d is negative and the non-circle side thereof is positive. Furthermore, the current n4ib continues to flow clockwise through a path passing along 5b, 5d, Co, Q4, and 5b due to a leakage inductance (not shown) of the quaternary winding 5d. Therefore, a current always passes through the load RL irrespective of whether the switch Q1 is ON or OFF, so that a ripple current of the smoothing capacitor Co can be reduced.

Since the secondary winding 5b and the quaternary winding 5d have the same number of turns and opposite polarities, the magnetomotive forces of the both windings 5b and 5d are eliminated and become zero. That is, the DC excitation is canceled.

Accordingly, the impedance on the secondary side of the transformer T3 viewed from the primary side thereof is increased, and when the switch Q2 is turned OFF at time t3 (same as time t1), the current of the switch Q2 is almost enough to discharge the energy in the capacitor C1. Therefore, the electrical potential of the switch Q1 decreases to zero, and then the diode D1 becomes conductive. At this time, zero-voltage switching of the switch Q1 can be achieved by turning ON the switch Q1.

On the other hand, when a load current decreases (during light load condition), a current of the quaternary winding 5d flowing therethrough when the switch Q2 is turned ON becomes zero while the switch Q2 is ON, but the switch Q4 remains ON. Therefore, the electric charge stored in the smoothing capacitor Co is discharged, and the current n4ib' flows counterclockwise through a path passing along Co, 5d, 5b, Q4, and Co so that the energy is stored in the quaternary winding 5d.

Next, when the switch Q2 is turned OFF and also the switch Q1 is turned ON, the switch Q4 is turned OFF and the switch Q3 is turned ON. Therefore, the energy stored in the quaternary winding 5d is transferred to the capacitor C5 via the diode D5. That is, the diode D5 is activated and the energy is stored in the capacitor C5, so that a spike voltage is absorbed.

Furthermore, since a voltage is generated at one end (at filled circle (●) side) of the tertiary winding 5c of the transformer T3, this voltage is applied to the gate of the switch Q5 to turn ON the switch Q5. This causes the current Q5i' to flow clockwise through a path passing along C5, Q5, 5b, and C5, and finally the energy stored in the capacitor C5 is returned to the DC power source vdc1 on the primary side via the secondary winding 5b and the primary winding 5a.

Therefore, the voltage Q4v of the switch Q4 is clamped, and therefore no spike voltage is generated. This makes it possible to set the withstand voltage of the switch Q4 at a lower level. Accordingly, since a low ON-resistance power device can be used, the losses can be further reduced.

As described above, according to the DC conversion apparatus of the fourth embodiment, the energy stored in the quaternary winding 5d due to a current backflow caused under light load condition is transferred to the capacitor C5 via the diode D5, and this energy is returned to the primary side of the transformer T3 without any loss by use of the switch Q5 that is turned ON synchronously when the switch Q1 is ON, so that the spike voltage can be eliminated.

Furthermore, the diode D6 operates to suppress the spike voltage, by absorbing the energy of the spike voltage generated at recovery time of the diode D3 in the capacitor C5. Therefore, a device with a low withstand voltage device can be employed, thereby reducing losses.

The quaternary winding 5d is provided on the secondary side of the transformer T3, the primary winding 5a and the quaternary winding 5d are loosely coupled with each other, and the primary winding 5a and the secondary winding 5b are tightly coupled with each other. When the switch Q1 is ON, the DC excitation of the transformer T3 in its operating state is canceled by magnetomotive forces having the same magnitude but in opposite directions at the primary winding 5a and the quaternary winding 5d, and when the switch Q1 is OFF, the DC excitation of the transformer T3 in its operating state is canceled by magnetomotive forces having the same magnitude but in opposite directions at the secondary winding 5b and the quaternary winding 5d. Therefore, the exciting inductance can be increased, thereby reducing exciting current and thus reducing losses. Furthermore, zero-voltage switching can be achieved, and a compact, highly efficient, and low-noise DC conversion apparatus can be obtained.

In the DC conversion apparatus according to the fourth embodiment shown in FIG. 10, the waveform shaping circuit 11 as shown in FIG. 5 can be provided between one end of the tertiary winding 5c of the transformer T3 and the gate of the switch Q5. This also offers the same advantageous effect as that obtained in the second embodiment.

In the DC conversion apparatus of the fourth embodiment shown in FIG. 10, a configuration without having an active-clamp circuit on the input side of a transformer, for example, the configuration as shown in FIG. 3, can also be employed.

Fifth Embodiment

Figure 13:
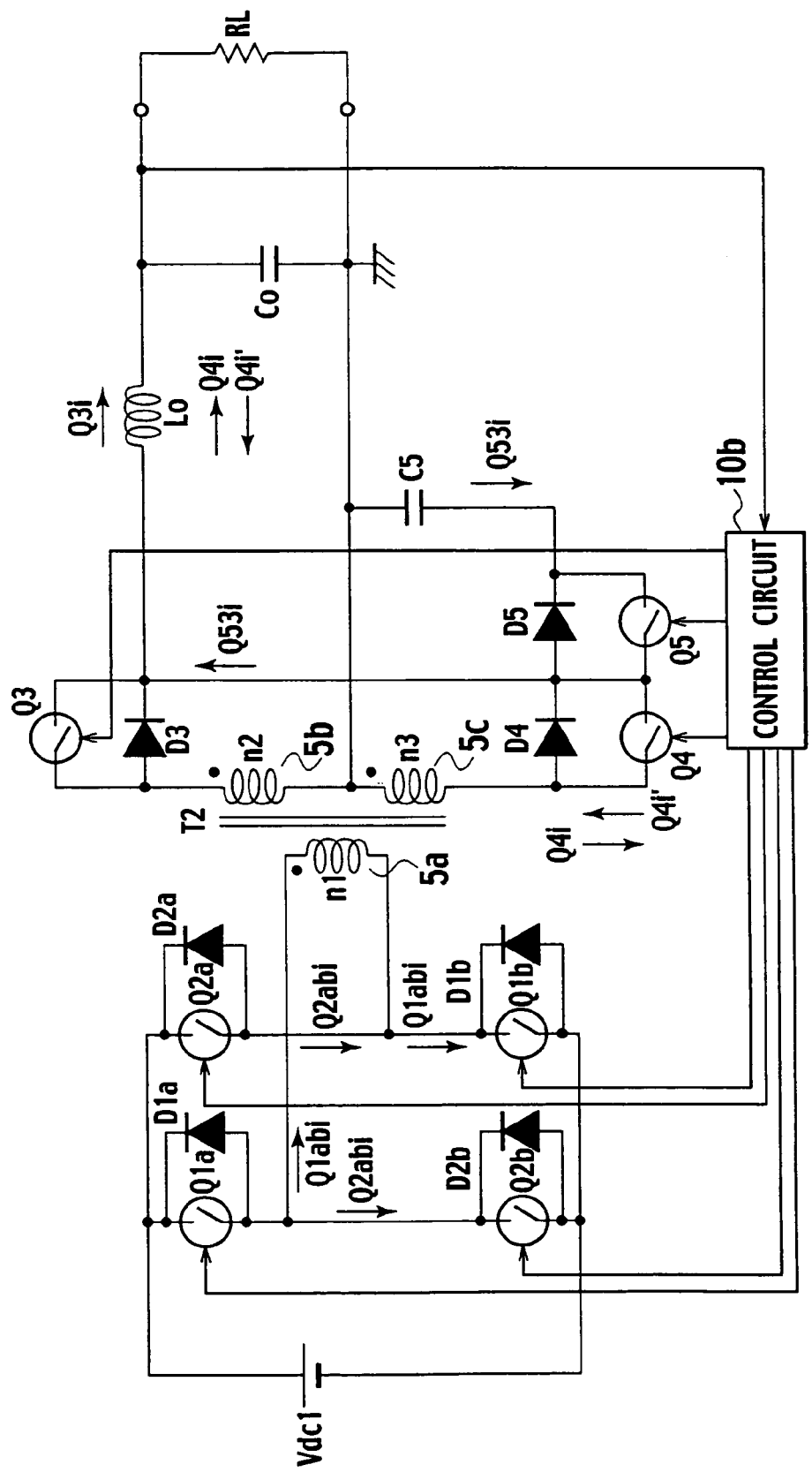
FIG. 13 is a circuit configuration diagram of a DC conversion apparatus according to a fifth embodiment.

FIG. 13 is a circuit configuration diagram of a DC conversion apparatus according to a fifth embodiment. The DC conversion apparatus of the fifth embodiment is an example of the apparatus applied to a push pull circuit. In the first to the fourth embodiments, drive signals of the switches Q3, Q4, and Q5 are self-excitation signals, and are generated by voltages of the secondary winding 5b and the tertiary winding 5c. In the fifth embodiment, on the other hand, a control circuit 10b generates drive signals for the switches Q3, Q4, and Q5.

In FIG. 13, a series circuit of a switch Q1a (first switch) and a switch Q2b (second switch), and also a series circuit of a switch Q2a (third switch) and a switch Q1b (fourth switch) are connected to both ends of the DC power source vdc1. Both ends of a primary winding 5a of the transformer T2 are connected to a joint of the switch Q1a and the switch Q2b, and also a joint of the switch Q2a and the switch Q1b. The switches Q1a, Q2a, Q1b, and Q2b are connected to diodes D1a, D2a, D1b, D2b, respectively. The switches Q1a, Q1b, Q2a, and Q2b each are MOSFET switches. The diodes D1a, D2a, D1b, and D2b can be parasitic diodes of the switches Q1a, Q2a, Q1b, and Q2b, respectively.

The switch Q1a and the switch Q1b are turned ON or OFF simultaneously with each other by PWM control of the control circuit 10b, and the switch Q2a and the switch Q2b are also turned ON or OFF simultaneously with each other by PWM control of the control circuit 10b. The switches Q1a and Q1b, and the switches Q2a and Q2b operate in a mutually complementary manner.

The primary winding 5a, the secondary winding 5b, and the tertiary winding 5c of the transformer T2 each has a winding structure so that a common mode voltage is generated. The secondary winding 5b and the tertiary winding 5c are connected in series, and one end (at filled circle (●) side) of the secondary winding 5b is connected to one end of a MOSFET switch Q3 (fifth switch) and the anode of the diode D3. One end of the tertiary winding 5c is connected to one end of a MOSFET switch Q4 (sixth switch) and the anode of the diode D4. The other end of the switch Q3 and the cathode of the diode D3 are connected to the other end of the switch Q4 and the cathode of the diode D4.

A series circuit of the smoothing reactor Lo and the smoothing capacitor Co is connected between a joint of the other end of the switch Q3 and the cathode of the diode D3, and a joint of the secondary winding 5b and the tertiary winding 5c. A series circuit of the diode D5 and the capacitor C5 is connected between a joint of the other end of the switch Q4 and the cathode of the diode D4, and the joint of the secondary winding 5b and the tertiary winding 5c. The diode D5 is connected between the drain and the source of a MOSFET switch Q5 (seventh switch) at both ends of the diode D5.

The control circuit 10b turns ON or OFF the switches Q1a, Q1b, and Q3 at the same time, also turns ON or OFF the switches Q2a, Q2b, and Q4 at the same time, and further causes the switches Q1a, Q1b, and Q3, and the switches Q2a, Q2b, and Q4 to operate in a mutually complementary manner. The control circuit 10b turns ON the switch Q5 during a period for which the control circuit 10b turns ON the switches Q1a, Q1b, and Q3 at the same time.

Operations of the DC conversion apparatus thus configured in the fifth embodiment will be explained. First, when the switches Q1a, Q1b, and Q3 are turned ON simultaneously under high load condition, a current Q1abi flows through a path passing along vdc1, Q1a, 5a, Q1b, and vdc1. Therefore, on the secondary side of the transformer T2, a current Q3i flows through a path passing along 5b, Q3, Lo, Co, and 5b, so that electric power is supplied to a load RL.

Next, when the switches Q2a, Q2b, and Q4 are turned ON simultaneously, a current Q2abi flows in a reverse direction through a path passing along vdc1, Q2a, 5a, Q2b, and vdc1 into the primary winding 5a. Therefore, on the secondary side of the transformer T2, a current Q4i flows through a path passing along 5c, Q4, Lo, Co, and 5c, so that electric power is supplied to the load RL.

Therefore, DC power is always supplied to the load RL irrespective of whether the switches Q1a to Q2b are ON or OFF. That is, since the switches Q3 and Q4 are operating for full-wave rectification, a ripple current is reduced and an output voltage becomes more stable.

Under light load condition, on the other hand, a current of the smoothing reactor Lo flowing therethrough when the switches Q1a and Q1b are turned OFF becomes zero while the switches Q1a and Q1b are OFF, but the switch Q4 remains ON. Therefore, the electric charge stored in the smoothing capacitor Co is discharged, and a current Q4i' flows through a path passing along Co, Lo, Q4, 5c, and Co, so that the energy is stored in the smoothing reactor Lo.

Subsequently, when the switches Q1a and Q1b are turned ON, the switch Q3 is turned ON and the switch Q4 is turned OFF. Therefore, the energy stored in the smoothing reactor Lo is transferred to the capacitor C5 via the diode D5. That is, the diode D5 is activated and the energy is stored in the capacitor C5, so that a spike voltage is absorbed therein.

Next, when the switch Q5 is turned ON by a signal from the control circuit 10b while the switches Q1a, Q1b, and Q3 are in ON state, a current Q53i flows through a path passing along C5, Q5, Q3, 5b, and C5, and finally, the energy stored in the capacitor C5 is returned to the DC power source vdc1 on the primary side via the secondary winding 5b and the primary winding 5a.

As described above, according to the DC conversion apparatus of the fifth embodiment, the energy stored in the smoothing rector Lo due to a current backflow caused under light load condition is stored transferred to the capacitor C5 via the diode D5, and by use of the switch Q5 that is tuned ON synchronously when the switches Q1a and Q1b are ON, the energy is returned to the primary side of the transformer T2 without any loss, so that the spike voltage can be eliminated. Therefore, the withstand voltage of a rectification device can be lowered, and ON-resistance can be reduced because a device with lower withstand-voltage can be employed. Furthermore, a C-R absorber for preventing the spike voltage can be eliminated, thereby simplifying the circuitry.

ADVANTAGES OF THE INVENTION

According to the present invention, the energy stored in a smoothing reactor due to a current backflow under light load condition is transferred to a capacitor via a diode, and by use of a second switch that is turned ON synchronously when a first switch is ON, the energy is returned to the primary side of a transformer without any loss, so that a spike voltage can be eliminated. Therefore, a required withstand voltage of a device used for a synchronous rectifier can be lowered, so that a device with lower withstand-voltage can be employed. Furthermore, a circuit that causes losses, such as a surge absorber, is not necessary, and therefore losses can be reduced. Accordingly, a highly efficient and small DC conversion apparatus can be obtained.

INDUSTRIAL APPLICABILITY

The present invention is applicable to a switching power source, such as a DC-DC converter and an AC-DC converter.

This application claims benefit of priority under 35USC §119 to Japanese Patent Application No. 2004-381737, filed on Dec. 28, 2004, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A DC conversion apparatus comprising:
a first switch configured to carry out ON/OFF operations via a primary winding of a transformer to convert a DC voltage provided by a DC power source into high-frequency voltage;
a synchronous rectifying circuit configured to carry out synchronous rectification of a high-frequency voltage generated at a secondary winding of the transformer;
a smoothing circuit having a smoothing reactor and a smoothing capacitor configured to smooth a rectified output of the synchronous rectifying circuit and to output a DC voltage;
a storage capacitor configured to store energy being stored in the smoothing reactor and transferred thereto via a diode due to a current backflow of the synchronous rectifying circuit flowing under a light load condition;
a second switch configured to turn ON in synchronization with the first switch and to return the energy stored in the storage capacitor to the DC power source at a primary side of the transformer via the transformer; and
a control circuit configured to turn ON/OFF the first switch.

2. A DC conversion apparatus comprising:
a first switch configured to carry out ON/OFF operations via a primary winding of a transformer to convert a DC voltage provided by a DC power source into high-frequency voltage;
a synchronous rectifying circuit configured to carry out synchronous rectification of a high-frequency voltage generated at a secondary winding of the transformer;
a smoothing circuit having a smoothing reactor and a smoothing capacitor configured to smooth a rectified output of the synchronous rectifying circuit and outputs a DC voltage;
a storage capacitor configured to store energy being stored in the smoothing reactor and transferred thereto via a diode due to a current backflow of the synchronous rectifying circuit flowing under light load condition;
a second switch configured to turn ON in synchronization with the first switch and to return the energy stored in the storage capacitor to the DC power source at a primary side of the transformer via the transformer;
a series circuit of a third switch and a clamp capacitor, the series circuit being connected to both ends of the primary winding of the transformer or to both ends of the first switch; and
a control circuit configured to alternately turn ON/OFF the first switch and the third switch.

3. The DC conversion apparatus according to claim 1, wherein
the smoothing reactor is formed in an auxiliary winding of the transformer,
the secondary winding of the transformer is tightly coupled with the primary winding of the transformer, and
the auxiliary winding of the transformer is loosely coupled with the primary winding.

4. The DC conversion apparatus according to claim 2, wherein
the smoothing reactor is formed in an auxiliary winding of the transformer,
the secondary winding of the transformer is tightly coupled with the primary winding of the transformer, and
the auxiliary winding of the transformer is loosely coupled with the primary winding.

5. The DC conversion apparatus according to claim 3, wherein
the number of turns of the secondary windings of the transformer is the same as that of the auxiliary winding,
the secondary winding has a winding phase opposite to that of the primary winding of the transformer, and
the auxiliary winding has the same winding phase as that of the primary winding.

6. The DC conversion apparatus according to claim 4, wherein
the number of turns of the secondary windings of the transformer is the same as that of the auxiliary winding,
the secondary winding has a winding phase opposite to that of the primary winding of the transformer, and
the auxiliary winding has the same winding phase as that of the primary winding.

7. The DC conversion apparatus according to claim 1, further comprising:
a tertiary winding of the transformer being connected to the secondary winding of the transformer in series, wherein
the second switch is turned ON by a voltage generated at the tertiary winding of the transformer as the first switch is turned ON, and the energy stored in the storage capacitor is returned to the DC power source at the primary side thereof via the transformer.

8. The DC conversion apparatus according to claim 2, further comprising:
a tertiary winding of the transformer being connected to the secondary winding of the transformer in series, wherein
the second switch is turned ON by a voltage generated at the tertiary winding of the transformer when the first switch is turned ON, and the energy stored in the storage capacitor is returned to the DC power source at the primary side thereof via the transformer.

9. The DC conversion apparatus according to claim 1, further comprising an ON-time setting unit configured to set an ON-time of the second switch to be shorter than that of the first switch.

10. The DC conversion apparatus according to claim 2, further comprising an ON-time setting unit configured to set an ON-time of the second switch to be shorter than that of the first switch.

11. A DC conversion apparatus comprising:
a first series circuit of a first switch and a second switch, the first series circuit being connected to both ends of a DC power source;
a second series circuit of a third switch and a fourth switch, the second series circuit being connected to the both ends of the DC power source;
a primary winding of a transformer being connected to a joint of the first switch and the second switch, and to a joint of the third switch and the fourth switch;
a synchronous rectifying circuit configured to perform synchronous rectification of high-frequency voltages generated at the secondary winding and the tertiary winding of the transformer, the synchronous rectifying circuit having a fifth switch connected to the secondary winding of the transformer, and a sixth switch connected to a tertiary winding that is connected to the secondary winding of the transformer in series;

a smoothing circuit having a smoothing reactor and a smoothing capacitor configured to smooth a rectified output of the synchronous rectifying circuit and outputs a DC voltage;

a storage capacitor configured to store energy being stored in the smoothing reactor and transferred thereto via a diode due to a current backflow of the synchronous rectifying circuit flowing under a light load condition;

a seventh switch configured to return the energy stored in the storage capacitor to a primary side of the transformer via the transformer and to be turned ON in synchronization with the first switch and the fourth switch;

a control circuit configured to turn ON or OFF the first, the fourth, and the fifth switches, and the second, the third, and the sixth switches, in a mutually complementary manner, and to turn ON the seventh switch while the first, the fourth, and the fifth switches are turned ON at the same time.

* * * * *